Dec. 8, 1925.
C. E. WEAVER
1,564,733
REAR AXLE ASSEMBLY
Filed July 18, 1921
4 Sheets-Sheet 1
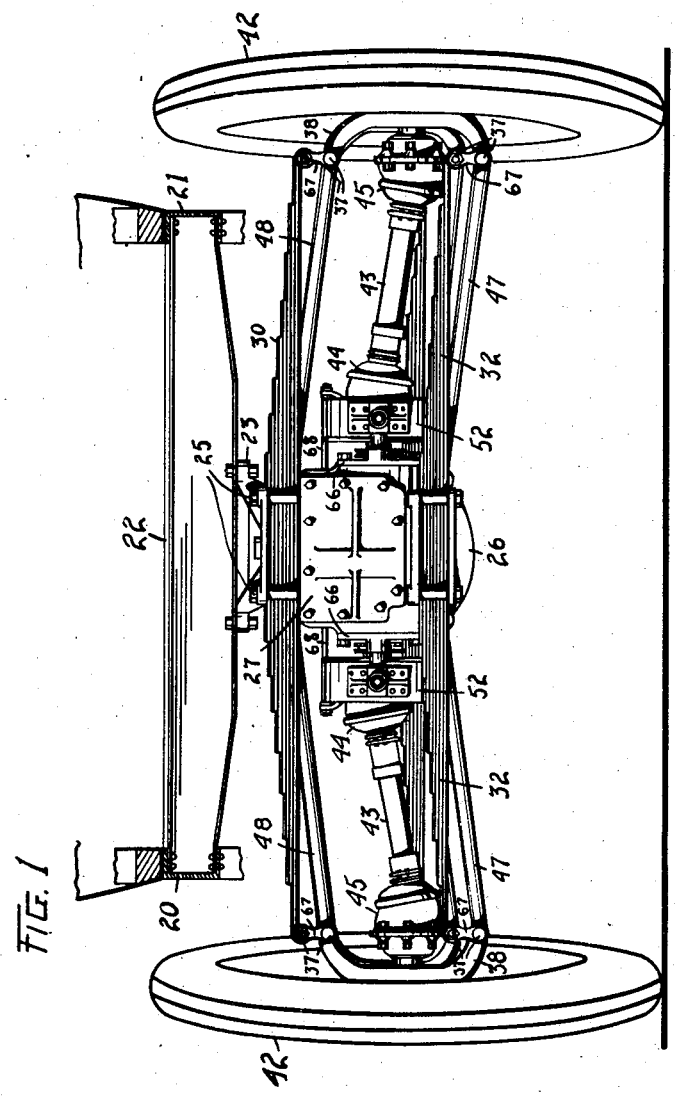
Inventor
Caius E. Weaver
By S. Arthur Baldwin
Attorney Dec. 8, 1925.  1,564,733
C. E. WEAVER
REAR AXLE ASSEMBLY
Filed July 18, 1921   4 Sheets-Sheet 2
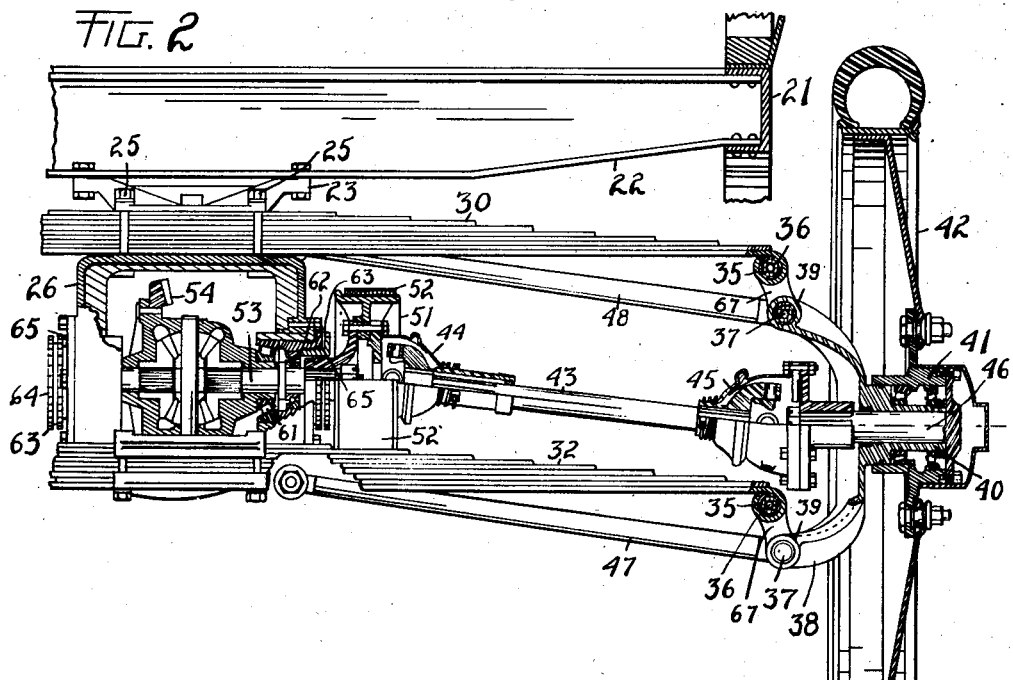
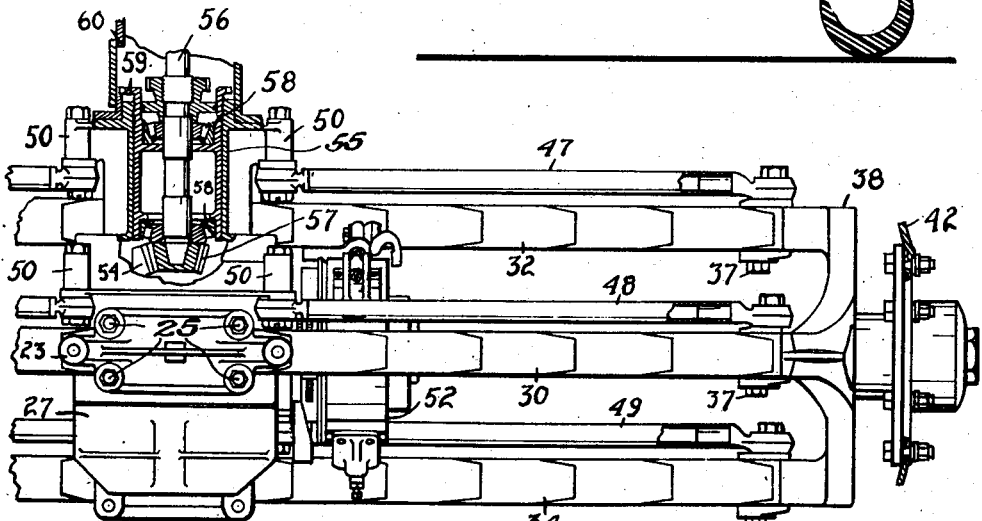

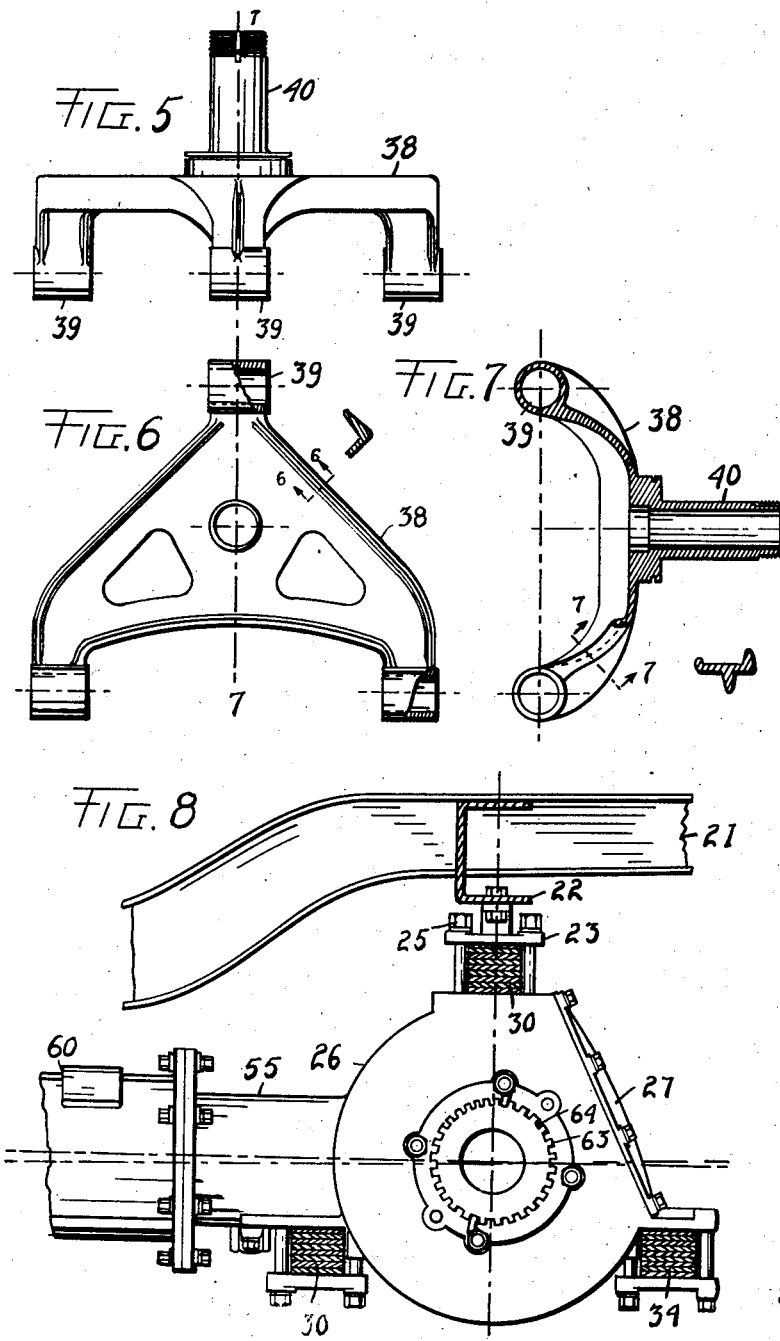

Dec. 8, 1925.  1,564,733
C. E. WEAVER
REAR AXLE ASSEMBLY
Filed July 18, 1921   4 Sheets-Sheet 4
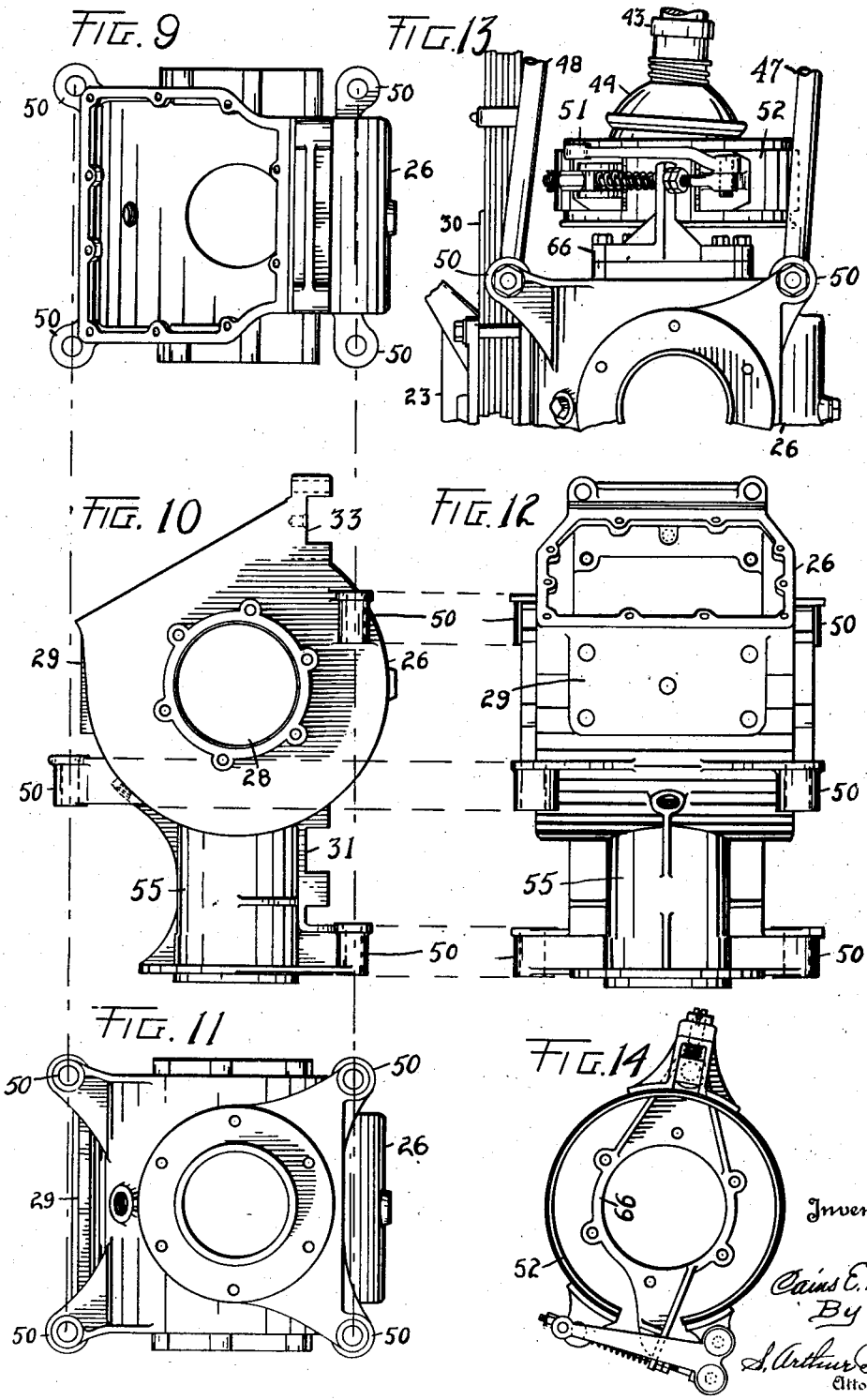

Patented Dec. 8, 1925.

1,564,733

UNITED STATES PATENT OFFICE.

CAIUS E. WEAVER, OF SYRACUSE, NEW YORK, ASSIGNOR TO BIRMINGHAM MOTORS, OF JAMESTOWN, NEW YORK, A TRUST.

REAR-AXLE ASSEMBLY.

Application filed July 18, 1921. Serial No. 485,598.

*To all whom it may concern:*

Be it known that I, CAIUS E. WEAVER, a citizen of the United States, residing at the city of Syracuse, in the county of Onondaga and State of New York, have invented certain new and useful Improvements in Rear-Axle Assemblies, of which the following, taken in connection with the accompanying drawings, is a specification.

The invention relates to rear axles of automobiles and similar vehicles; and the improvement consists, first, in providing a centrally placed differential casing having seats for attaching the central portions of the semi-elliptical springs thereto, the differential casing thereby providing a strong central supporting column for said springs, one of said semi-elliptic springs being placed centrally crosswise of the top of said casing, and the two lower springs secured in seats on the under side of said casing and about equi-distant from the center line thereof so as to form a triangular or pyramidal arrangement to guard against both front and rear shocks; second, to connect the outer ends of said springs by strong triangular spiders each having a wheel spindle extending out centrally therefrom; third, to provide strong, preferably tubular parallel radius rods to connect said differential casing and spiders alongside each half of each spring, said connection being made by shackle links at the outer ends and having oil-less bushings to thereby give strong control for the crosswise springs; and fourth; to provide Cardan shafts having universal joints at each end thereof one each side of said differential casing and connected to said wheel spindles to turn the same; and the invention consists in the novel features and combinations hereinafter set forth and claimed.

In the drawings, Figure 1 is a rear elevation of the rear axle assembly with wheels thereon showing the preferred construction and arrangement of the same, a portion of the body being shown in section. Fig. 2 is a partially sectional view of the differential casing, brake drum, Cardan shaft, the spider and wheel showing the construction and connection of the different parts and the manner in which the driving axle and brake drum are assembled into the differential casing, the opposite side portion and wheel being broken away. Fig. 3 is a top plan view of the rear axle assembly, the forward portion of the differential casing being shown in section, one end of said assembly and the wheel portion being broken away. Fig. 4 is a sectional view of the preferred form of one of the oil-less bushings. Fig. 5 is a top plan view of the triangular shaped spider for connecting and supporting the outer ends of the crosswise springs, and also showing the wheel spindle thereon. Fig. 6 is an elevation of the inner side of said triangular shaped spider showing the preferred arrangement of the same, two of the tubular bearings for the spring ends being shown partially in section, and a section is shown of the annular or flanged edge of the spider at line 6—6 in said figure. Fig. 7 is a vertical sectional view at line 7—7 in Figs. 5 and 6 of said spider showing the preferred shape and arrangement of the same and the tubular integral wheel spindle extending out therefrom, the strengthening ribs or flanged edge construction of said spider being shown in a cross sectional view at line 7—7 in said figure. Fig. 8 is an endwise elevation of the differential casing, showing the substantially one-piece construction of the same and the triangularly placed seats for the triple spring suspension, which springs are shown in section, a portion of the rear automobile frame part and the cross member within said frame being shown, as well as the connection to the torque tube. Fig. 9 is a rear elevation, and Fig. 10 is an endwise elevation, and Fig. 11 is a front elevation, and Fig. 12 is a top plan view, of the differential casing as projected from said endwise elevation in Fig. 10, showing the preferred single piece construction and arrangement of the same. Fig. 13 is a front elevation of the differential casing showing the connection of the brake drum thereto and the arrangement of said brake drum, the driving or Cardan shaft, radius rods and spring being broken away; and Fig. 14 is a side elevation of the brake mechanism showing the preferred arrangement of the same.

Like characters of reference refer to corresponding parts in the several views.

The numerals 20 and 21 designate the rear side portions or units of the automobile frame which are connected by the crosswise channel bar 22 over the central portion of the rear axle assembly, being attached centrally by the plate 23 over the top of the central upper crosswise spring 24 by means of bolts 25 at each side, which bolts extend down into the differential casing 26.

The differential casing 26 is preferably made substantially integral, that is in one piece having the rear cover 27 to admit to the interior of the casing for the assemblage of the differential gears and bearings therein through the openings or ports 28 at each side of said differential casing, as will be hereinafter described. Said differential casing has the seats 29 for the upper spring 30, and 31 for the forward lower spring 32, and 33 for the rear lower spring 34. Said springs are rigidly attached or clamped to said differential casing seats by means of bolts on each side and suitable clamping plates which hold the central portions of the springs firmly in position and make a rigid central column of the differential casing 26.

The outer ends of the springs are each turned in a loop 35 which receives therethrough a shackle link bolt with oil-less bushing 36, as shown in section in Figs. 2 and 4. The opposite ends of the shackle links are similarly attached by means of shackle link bolts 37 to a triangular triple bearing spider 38, said spider 38 having the tubular bearings 39 to receive said shackle link bolts 37 therethrough with oilless bushings.

The spiders 38 have the tubular integral spindles 40 extending out from the central portion thereof to support the wheel hub 41 thereon on suitable lower bearings, substantially as shown in section in Fig. 2. The wheel 42 is turned in the following manner: The pinion shaft 56 which is rotated by the engine by means of a propeller shaft turns the differential gear by means of a pinion gear 57 and ring gear 54 which in turn rotates the differential stub shaft 53, turning the driving or Cardan shaft 43 through the universal joint 44, thus turning the wheel through the universal joint 45 and stub shaft 46. The stub shaft 46 is solidly bolted to the wheel hub 41 and thereby turns the wheel through the driving parts as outlined, driving the wheel in either direction according as to whether the transmission gears are in forward or reversing position.

The springs 30, 32 and 34 are each controlled or held in perfect alinement by means of strong tubular radius rods 47, 48 and 49, each side of the central differential casing, which radius rods are pivotally attached at the outer ends by the shackle link bolts 36 which hold the outer ends of the springs, and at their inner ends they are provided with similar bolt bearings in the tubular projections 50 on said differential casing, which bearings 50 are so placed as to bring said radius rods 47, 48 and 49 into parallel alinement so that the wheel 42 is held firmly in vertical alinement in its movements upward and downward by means of said radius rods, yet said wheel is permitted to move upward and downward a spaced distance sufficient to clear any normal obstructions without affecting the other wheel or wheels or the body of the vehicle and the occupants of the same.

This construction permits the brake drums 51 to be placed adjacent the opposite sides of the differential casing 26, said brake drums 51 being provided with external contracting brake bands 52 so that they may be connected by a short equalizing bar and a single brake rod to the brake control lever or pedal. The brake bands 52 are provided with spring take-ups for the same. The brake bands 52 are supported around said brake drums 51 by the brake supports 66. Said brake supports 66 are bolted to the differential casing around the openings 28 for the differential stub shaft bearing. The brake drums 51 are thus attached on one side to the driving or Cardan shafts 43 by the universal joint 44, and on the other to a stub shaft 53 which is turned by the differential ring gear 54.

The differential casing 26 has the forward projecting tubular portion 55 within which, as shown in section in Fig. 3, the rear end of the pinion drive shaft 56 is received, which drive shaft has the pinion gear 57 on its rear end which turns the differential ring gear 54. The pinion drive shaft 56 is preferably provided with a roller bearing cage 58, which cage 58 is adjusted by means of the notched and flanged end 59 and the opening 60 through which the adjusting wrench can be inserted.

The stub 53 which connects the brake drum 51 to the differential gear 54 is supported in the differential casing 26 by the roller bearings 61 and ball bearings 62, which roller bearings 61 support the differential gearing and are controlled by the sleeves 63 with its notched outer rim 64. The ball bearing 62 supports the differential stub shaft 53 which bearing 62 is adjusted by the sleeve 65. The two sleeves 63 and 65 are adjustable from the outer side of each opening 28 in the sides of the differential casing 26 so that said differential gear 54 may be adjusted from the outer side of the differential casing 26.

The differential casing 26 performs five functions: It is, first, a housing for the differential gearing and rear end of the pinion shaft; it is, second, provided with seats for the crosswise suspension springs and thereby becomes a rigid column for the support of the central portion of said springs; thirdly, it is also provided with the tubular bearings or anchoring points for the inner ends of the radius rods, fourth, forms a rigid support for the brake drums permitting a short equalizing bar and single brake rod; and fifth, it is solidly built into the automobile chassis, giving solidity and rigidity to all different parts assembling into and out of the same as well as upon and around the same.

The cover 27 admits to the interior of the differential casing 26, permitting the assembly and renewal of any of the parts assembled into said casing. Said cover is not a part of said casing in so far as its general offices are concerned, but only serves as a closure for the same.

What is claimed as new is:

1. In an automobile rear axle assembly, a differential casing having integral solid seats at its top and bottom, springs engaged at their central portions against the seats, means to immovably connect said portions of the springs to the seats, wheel carriers, shackle links movably connected at one end to the carriers and movably connected at their opposite ends to the outer ends of the springs so as to cause the outer ends of the springs to bear downwardly on and be movably relative to the carriers, and radius rods movably connected to the differential casing and to the carriers.

2. In an automobile rear axle assembly, a differential casing having integral solid seats at its top and bottom, springs engaged at their central portions against the seats, means to immovably connect said portions of the bottom springs to the seats, wheel carriers, a member seated on the top spring in overlying relation to the top seat of the differential casing, means to immovably connect the member and therewith the central portion of the top spring to the top seat of the differential casing, a frame seated on the member, means to rigidly secure the frame to the member, means to movably connect the outer ends of the springs to the carriers to cause the springs to bear downwardly on the carrier, and radius rods pivotally connected to the differential casing and to the carriers.

3. In an automobile rear axle assembly, a differential casing having integral solid seats at its top and bottom, springs engaged at their central portions against the seats, means to immovably connect said portions of the bottom springs to the seats, wheel carriers, a member seated on the top spring in overlying relation to the top seat of the differential casing, means to immovably connect the member and therewith the central portion of the top spring to the top seat of the differential casing, a frame seated on the member, means to rigidly secure the frame to the member, shackle links pivotally connected at one end to the carriers and pivotally connected at their opposite ends to the outer ends of the springs so as to cause the outer ends of the springs to bear downwardly on and be movable relative to the carriers, and radius rods pivotally connected to the differential casing and to the carriers.

In testimony whereof I have affixed my signature.

CAIUS E. WEAVER.